(12) United States Patent
Sasaki

(10) Patent No.: US 12,061,941 B2
(45) Date of Patent: Aug. 13, 2024

(54) IMAGE FORMING SYSTEM FOR INSPECTING QUALITY OF IMAGE FORMED ON PRINTING MEDIUM

(71) Applicant: CANON KABUSHIKI KAISHA, Tokyo (JP)

(72) Inventor: Kensuke Sasaki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/299,205

(22) Filed: Apr. 12, 2023

(65) Prior Publication Data

US 2023/0385582 A1 Nov. 30, 2023

(30) Foreign Application Priority Data

May 24, 2022 (JP) ................. 2022-084729
Mar. 10, 2023 (JP) ................. 2023-037831

(51) Int. Cl.
- *H04N 1/60* (2006.01)
- *G06K 15/02* (2006.01)
- *G06T 7/00* (2017.01)
- *G06T 7/13* (2017.01)

(52) U.S. Cl.
CPC ....... *G06K 15/027* (2013.01); *G06K 15/1872* (2013.01); *G06T 7/001* (2013.01); *G06T 7/13* (2017.01); *G06T 2207/10008* (2013.01); *G06T 2207/30144* (2013.01)

(58) Field of Classification Search
None
See application file for complete search history.

(56) References Cited

U.S. PATENT DOCUMENTS

| | | | | |
|---|---|---|---|---|
| 10,547,752 | B2 * | 1/2020 | Fukase | H04N 1/00045 |
| 2019/0132454 | A1 * | 5/2019 | Fukase | H04N 1/00045 |
| 2020/0128135 | A1 | 4/2020 | Matsushita | |
| 2020/0401355 | A1 * | 12/2020 | Yamashita | G06F 3/1259 |
| 2022/0109780 | A1 * | 4/2022 | Suzuki | H04N 1/6005 |
| 2022/0309298 | A1 * | 9/2022 | Takagi | G06T 7/0004 |

FOREIGN PATENT DOCUMENTS

| | | | | |
|---|---|---|---|---|
| JP | 2003050184 | * | 2/2003 | H04N 1/00 |
| JP | 2014146859 | * | 8/2014 | H04N 1/00 |
| JP | 2014187609 | * | 10/2014 | H04N 1/6044 |
| JP | 2016178557 | * | 10/2016 | H04N 1/40 |
| JP | 2018101121 | * | 6/2018 | B41J 29/393 |
| JP | 2019087792 | A | 6/2019 | |
| JP | 2020067732 | A | 4/2020 | |

* cited by examiner

*Primary Examiner* — Beniyam Menberu
(74) *Attorney, Agent, or Firm* — ROSSI, KIMMS & McDOWELL LLP

(57) ABSTRACT

An image forming system includes: a background member of a black color provided at an opposite side to a reading unit with respect to a conveyance path; and at least one processor configured to form a test chart on a first printing medium based on RIP data corresponding to the test chart, and inspect an inspection target image formed on a second printing medium by an image forming apparatus based on first image data obtained by reading the inspection target image formed on the second printing medium and the RIP data corresponding to the inspection target image. The test chart includes light patch images and dark patch images surrounding the light patch images, and each one of the light patch images and the dark patch images has different density.

6 Claims, 12 Drawing Sheets

| | m-11 | m-10 | m-9 | m-8 | m-7 | m-6 | m-5 | m-4 | m-3 | m-2 | m-1 | m | m+1 | m+2 | m+3 | m+4 | m+5 | m+6 | m+7 | m+8 | m+9 | m+10 | m+11 |
|---|---|---|---|---|---|---|---|---|---|---|---|---|---|---|---|---|---|---|---|---|---|---|---|
| n-7 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |
| n-6 | 0.000 | 0.000 | 0.001 | 0.001 | 0.002 | 0.002 | 0.002 | 0.003 | 0.003 | 0.003 | 0.004 | 0.100 | 0.004 | 0.003 | 0.003 | 0.003 | 0.002 | 0.002 | 0.002 | 0.001 | 0.001 | 0.000 | 0.000 |
| n-5 | 0.000 | 0.004 | 0.008 | 0.012 | 0.015 | 0.019 | 0.023 | 0.027 | 0.031 | 0.035 | 0.038 | 0.200 | 0.038 | 0.035 | 0.031 | 0.027 | 0.023 | 0.019 | 0.015 | 0.012 | 0.008 | 0.004 | 0.000 |
| n-4 | 0.000 | 0.019 | 0.038 | 0.058 | 0.077 | 0.096 | 0.115 | 0.134 | 0.154 | 0.173 | 0.192 | 0.400 | 0.192 | 0.173 | 0.154 | 0.134 | 0.115 | 0.096 | 0.077 | 0.058 | 0.038 | 0.019 | 0.000 |
| n-3 | 0.000 | 0.048 | 0.096 | 0.144 | 0.192 | 0.240 | 0.288 | 0.336 | 0.384 | 0.432 | 0.480 | 0.600 | 0.480 | 0.432 | 0.384 | 0.336 | 0.288 | 0.240 | 0.192 | 0.144 | 0.096 | 0.048 | 0.000 |
| n-2 | 0.000 | 0.080 | 0.160 | 0.240 | 0.320 | 0.400 | 0.480 | 0.560 | 0.640 | 0.720 | 0.800 | 0.800 | 0.800 | 0.720 | 0.640 | 0.560 | 0.480 | 0.400 | 0.320 | 0.240 | 0.160 | 0.080 | 0.000 |
| n-1 | 0.000 | 0.100 | 0.200 | 0.300 | 0.400 | 0.500 | 0.600 | 0.700 | 0.800 | 0.900 | 1.000 | 1.000 | 1.000 | 0.900 | 0.800 | 0.700 | 0.600 | 0.500 | 0.400 | 0.300 | 0.200 | 0.100 | 0.000 |
| n | 0.000 | 0.100 | 0.200 | 0.300 | 0.400 | 0.500 | 0.600 | 0.700 | 0.800 | 0.900 | 1.000 | 1.000 | 1.000 | 0.900 | 0.800 | 0.700 | 0.600 | 0.500 | 0.400 | 0.300 | 0.200 | 0.100 | 0.000 |
| n+1 | 0.000 | 0.100 | 0.200 | 0.300 | 0.400 | 0.500 | 0.600 | 0.700 | 0.800 | 0.900 | 1.000 | 1.000 | 1.000 | 0.900 | 0.800 | 0.700 | 0.600 | 0.500 | 0.400 | 0.300 | 0.200 | 0.100 | 0.000 |
| n+2 | 0.000 | 0.080 | 0.160 | 0.240 | 0.320 | 0.400 | 0.480 | 0.560 | 0.640 | 0.720 | 0.800 | 0.800 | 0.800 | 0.720 | 0.640 | 0.560 | 0.480 | 0.400 | 0.320 | 0.240 | 0.160 | 0.080 | 0.000 |
| n+3 | 0.000 | 0.048 | 0.096 | 0.144 | 0.192 | 0.240 | 0.288 | 0.336 | 0.384 | 0.432 | 0.480 | 0.600 | 0.480 | 0.432 | 0.384 | 0.336 | 0.288 | 0.240 | 0.192 | 0.144 | 0.096 | 0.048 | 0.000 |
| n+4 | 0.000 | 0.019 | 0.038 | 0.058 | 0.077 | 0.096 | 0.115 | 0.134 | 0.154 | 0.173 | 0.192 | 0.400 | 0.192 | 0.173 | 0.154 | 0.134 | 0.115 | 0.096 | 0.077 | 0.058 | 0.038 | 0.019 | 0.000 |
| n+5 | 0.000 | 0.004 | 0.008 | 0.012 | 0.015 | 0.019 | 0.023 | 0.027 | 0.031 | 0.035 | 0.038 | 0.200 | 0.038 | 0.035 | 0.031 | 0.027 | 0.023 | 0.019 | 0.015 | 0.012 | 0.008 | 0.004 | 0.000 |
| n+6 | 0.000 | 0.000 | 0.001 | 0.001 | 0.002 | 0.002 | 0.002 | 0.003 | 0.003 | 0.003 | 0.004 | 0.100 | 0.004 | 0.003 | 0.003 | 0.003 | 0.002 | 0.002 | 0.002 | 0.001 | 0.001 | 0.000 | 0.000 |
| n+7 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |

TARGET REGION

IMAGE FORMING SYSTEM FOR INSPECTING QUALITY OF IMAGE FORMED ON PRINTING MEDIUM

BACKGROUND OF THE INVENTION

Field of the Invention

The present invention relates to an image forming system including an inspection apparatus that inspects the quality of an image formed on a printing medium.

Description of the Related Art

A known inspection apparatus (US-2020-128135) inspects the quality of an image formed on a printing medium, that is inspects whether or not an image is formed on the printing medium as indicated by image data. The inspection apparatus inspects an image formed on a printing medium by comparing inspection target data obtained by reading the image of a printed article using a scanner or the like and reference data, using RIP data as the reference data, for example. The inspection apparatus inspects the color of the image by comparing the red (R) data in the reference data and the red (R) data in the inspection target data, for example. This processing is also executed for green (G) and blue (B).

Here, the inspection target data obtained by reading by the scanner is image data obtained by reading an image formed on a printing medium by an image forming apparatus using yellow (Y), magenta (M), cyan (C), and black (K) toner on the basis of image data. Accordingly, the color of the image indicated by the inspection target data may be different (error component) to the color of the image indicated by the reference image, even when the image is formed on the printing medium as indicated in RIP data as the reference data. In a known configuration relating to this problem, a test chart including a predetermined pattern is formed by an image forming apparatus and then read by a scanner in order to calculate a correction parameter used to correct the error component with respect to the RIP data.

When the scanner reads the test chart, the reading result of a target pixel is affected by a region different from the target pixel in the test chart. Hereinafter, the phenomenon of the reading result of the target pixel being affected by the surrounding region is referred to as "reflection". When the reading result of the test chart is affected by reflection, the accuracy of the correction parameter may be degraded. As a result, the accuracy of the inspection of the quality of an image formed on a printing medium is reduced.

SUMMARY OF THE INVENTION

According to an aspect of the present invention, an image forming system comprising: an image forming apparatus configured to form an image on a printing medium on a basis of RIP data; a reading apparatus including: a reading unit configured to read the image formed on the printing medium conveyed from the image forming apparatus via a transparent member at a reading position in a conveyance direction of the printing medium, the reading unit including a light-emitting unit configured to emit light to the printing medium, and a sensor configured to receive light emitted by the light-emitting unit and reflected by the printing medium, and a background member of a black color provided on the reading position in the conveyance direction and an opposite side to the reading unit with respect to a conveyance path for conveying the printing medium; and at least one processor configured to: control the image forming apparatus to form a test chart that is a predetermined image on a first printing medium as the printing medium based on the RIP data corresponding to the test chart, and inspect an inspection target image formed on a second printing medium as the printing medium by the image forming apparatus based on first image data obtained by the reading apparatus reading the inspection target image formed on the second printing medium and the RIP data corresponding to the inspection target image, wherein the test chart includes a plurality of light patch images and a plurality of dark patch images formed surrounding the plurality of light patch images, and each one of the plurality of light patch images and the plurality of dark patch images has different density.

Further features of the present invention will become apparent from the following description of exemplary embodiments with reference to the attached drawings.

DESCRIPTION OF THE EMBODIMENTS

Figure 1:
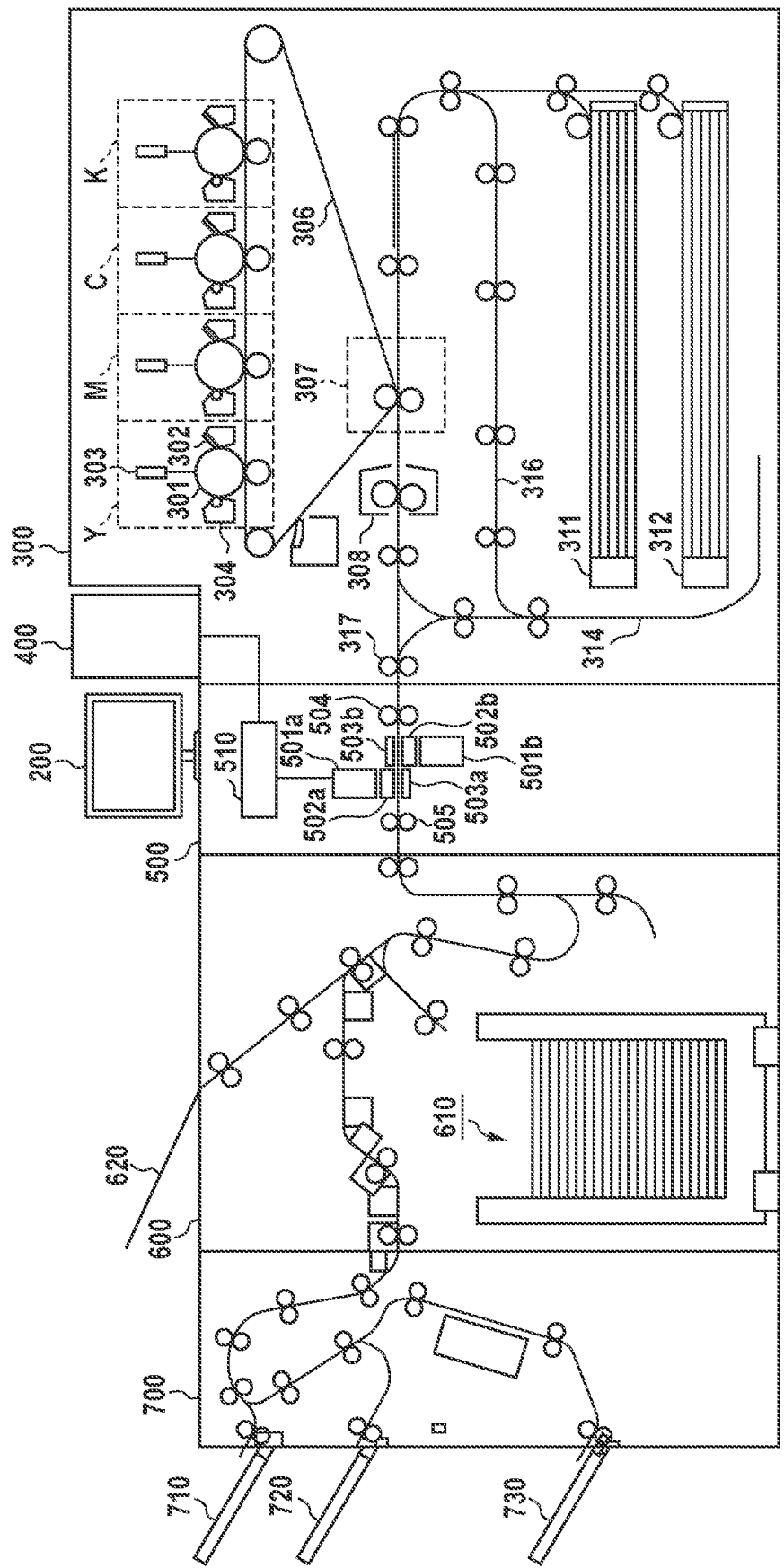
FIG. 1 is a configuration diagram of an image forming system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Configuration of Image Forming System

FIG. 1 is a configuration diagram of an image forming system according to the present embodiment. An operation unit 200 provides an input interface and an output interface with the user. The input interface is an input key, a touch panel, and the like, for example. The output interface is a display, a speaker, and the like, for example. The operation unit 200 transmits instructions and data input by the user via the input interface to a controller 400. Also, the operation unit 200 outputs information from the output interface according to an instruction from the controller 400. The controller 400 controls an image forming apparatus 300, an inspection apparatus 500, a stacker 600, and a finisher 700 on the basis of instructions and data input from the operation unit 200 or instructions and data acquired from an external apparatus via a network.

The image forming apparatus 300 includes image forming units Y, M, C, and K. The image forming units Y, M, C, and K form yellow (Y), magenta (M), cyan (C), and black (K) images and transfers these onto an intermediate transfer member 306. By the image forming units Y, M, C, and K superimposing the color images and transferring them onto the intermediate transfer member 306, different colors from yellow, magenta, cyan, and black can be produced. The configurations of the image forming units Y, M, C, and K are similar and each include a photosensitive member 301, a charging device 302, an exposure device 303, and a developing device 304. The photosensitive member 301 is rotationally driven in the anticlockwise direction of the drawing when forming an image. The charging device 302 uniformly charges the surface of the rotating photosensitive member 301. The exposure device 303 acquires image data from the controller 400 and exposes the photosensitive member 301 according to the image data to form an electrostatic latent image on the photosensitive member 301. The developing device 304 includes toner corresponding to the colors and forms an image (toner image) on the photosensitive member 301 by developing the electrostatic latent image on the photosensitive member 301 using the toner.

As described above, images formed by the image forming units Y, M, C, and K on the photosensitive members 301 are transferred onto the intermediate transfer member 306. The intermediate transfer member 306 is rotationally driven in the clockwise direction of the drawing when forming an image. Accordingly, the image transferred onto the intermediate transfer member 306 is conveyed to a transfer unit 307. The printing medium stored in cassettes 311 and 312 is conveyed to the transfer unit 307 by rollers provided along the conveyance path of the printing medium. The transfer unit 307 transfers the image on the intermediate transfer member 306 onto the printing medium. After image transferal, the printing medium is conveyed to a fixing device 308. The fixing device 308 applies heat and pressure to the printing medium to fix the image to the printing medium.

When forming an image on only one side of the printing medium, after image fixing, the printing medium with the formed image, that is the printed article, is passed to the inspection apparatus 500 by a discharge roller 317. When forming an image of both sides of the printing medium, after the image is fixed on one side, the printing medium is conveyed again to the transfer unit 307 via a conveyance path 314 and a conveyance path 316, and the image is formed on the other side. The printing medium with the image formed on both sides is conveyed to the inspection apparatus 500 after the image is fixed by the fixing device 308.

At the inspection apparatus 500, the printed article is conveyed along the conveyance path by conveyance rollers 504 and 505. A reading unit 501*a* reads the image on one side (a first surface) of the conveyed printed article on a reading position via a glass 502*a*. A reading unit 501*b* reads the image on the other side (a second surface) of the conveyed printed article via a glass 502*b*. The reading units 501*a* and 501*b* include a light-emitting unit and a light-receiving unit. The light-emitting unit includes a white light-emitting diode (LED), for example. Also, the light-receiving unit includes a plurality of light-receiving elements (pixels) that can receive red (R), green (G), and blue (B) light. For example, the light-receiving unit is a CMOS sensor provided with a RGB color filter. The pixels in the light-receiving unit receive reflected light emitted by the light-emitting unit and then reflected at the printed article. The light-receiving unit transmits the inspection target data (RGB data), that is the printed article reading result, to an inspection control unit 510 on the basis of the light-receiving result of each pixel. A backing 503*a* is provided at the opposite side to the glass 502*a* with respect to the conveyance path of the printed article. In a similar manner, a backing 503*b* is provided at the opposite side to the glass 502*b* with respect to the conveyance path of the printed article. The backings 503*a* and 503*b* are background members provided for fixing the background color when the reading unit 501*a* and the reading unit 501*b* read the image of the printed article.

The stacker 600 is provided with a large-capacity tray 610 and a purge tray 620. The stacker 600 discharges the printed article to either the large-capacity tray 610, the finisher 700, or the purge tray 620 on the basis of an instruction from the controller 400 and the result of the quality inspection by the inspection control unit 510.

The finisher 700 has the function of executing post-processing including printed article stapling processing, bookbinding processing, cutting processing, and the like according to an instruction from the controller 400. The finisher 700 discharges the printed article to one of discharge trays 710 to 730 according to an instruction from the controller 400.

Control Configuration of Image Forming System

Figure 2:
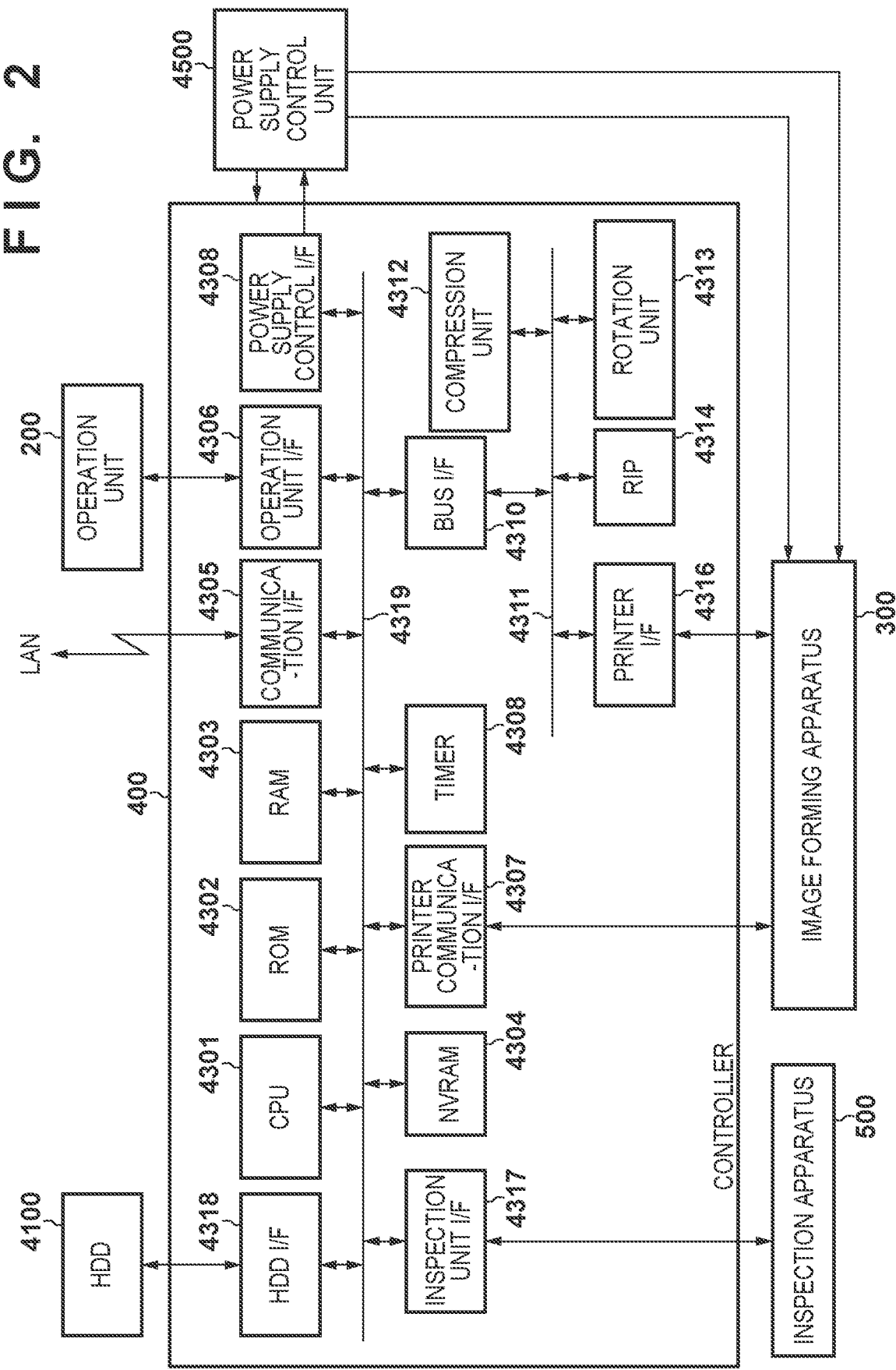
FIG. 2 is a configuration diagram of a controller according to an embodiment.

FIG. 2 is a configuration diagram of the controller 400. The image forming apparatus 300, the inspection apparatus 500, the stacker 600, the finisher 700, and the operation unit 200 as well as a hard disk drive (HDD) 4100 and a power supply control unit 4500 are connected to the controller 400. Note that in FIG. 2, in order to simplify the diagram, the stacker 600 and the finisher 700 are omitted. The power supply control unit 4500 controls the supply of power to the image forming system.

The functional blocks in the controller 400 illustrated in FIG. 2 are connected to a bus 4319 or a bus 4311. A bus OF 4310 is a bridge that connects the bus 4319 and the bus 4311. The controller 400 is provided with a Central Processing Unit (CPU) 4301, a Read Only Memory (ROM) 4302, and a Random Access Memory (RAM) 4303.

The CPU 4301 controls the operations of the image forming system by executing a computer program stored in the ROM 4302. The RAM 4303 provides a work area for the CPU 4301 to execute processing. Also, the RAM 4303 is used as an image memory for temporarily storing image data and the like. An NVRAM 4304 stores the various types of control parameters. A timer 4308 executes time management.

An operation unit I/F 4306 controls communication with the operation unit 200. A printer communication I/F 4307 controls communication with the image forming apparatus 300 via control of the CPU 4301. A power supply control I/F 4308 sends various types of power supply and stop instructions to the power supply control unit 4500 according to commands from the CPU 4301. An inspection unit I/F 4317 controls communication with the inspection apparatus 500 via control of the CPU 4301. An HDD I/F 4318 controls communication with the HDD 4100 via control of the CPU 4301.

A communication I/F 4305 is connected to a network such as a Local Area Network (LAN) and controls communication including the transmitting and receiving of emails, the input and output of PDL data from an external apparatus, and the like. A compression unit 4312 executes JPEG, JBIG, MMR, MH, and similar compression and expansion processing. A rotation unit 4313 executes image rotation processing. An RIP 4314, for example, develops the PDL data received from an external apparatus by the communication I/F 4305 into RIP data, which is bitmap raster image data. The RIP data is data represented by RGB, for example. When forming the image on the printing medium, the RIP data is converted to image corresponding to the YMCK colors, and the converted image data is transmitted to the image forming apparatus 300 by a printer I/F 4316. The image forming apparatus 300 forms an image on the printing medium using the method described above on the basis of the transmitted image data.

Figure 3:
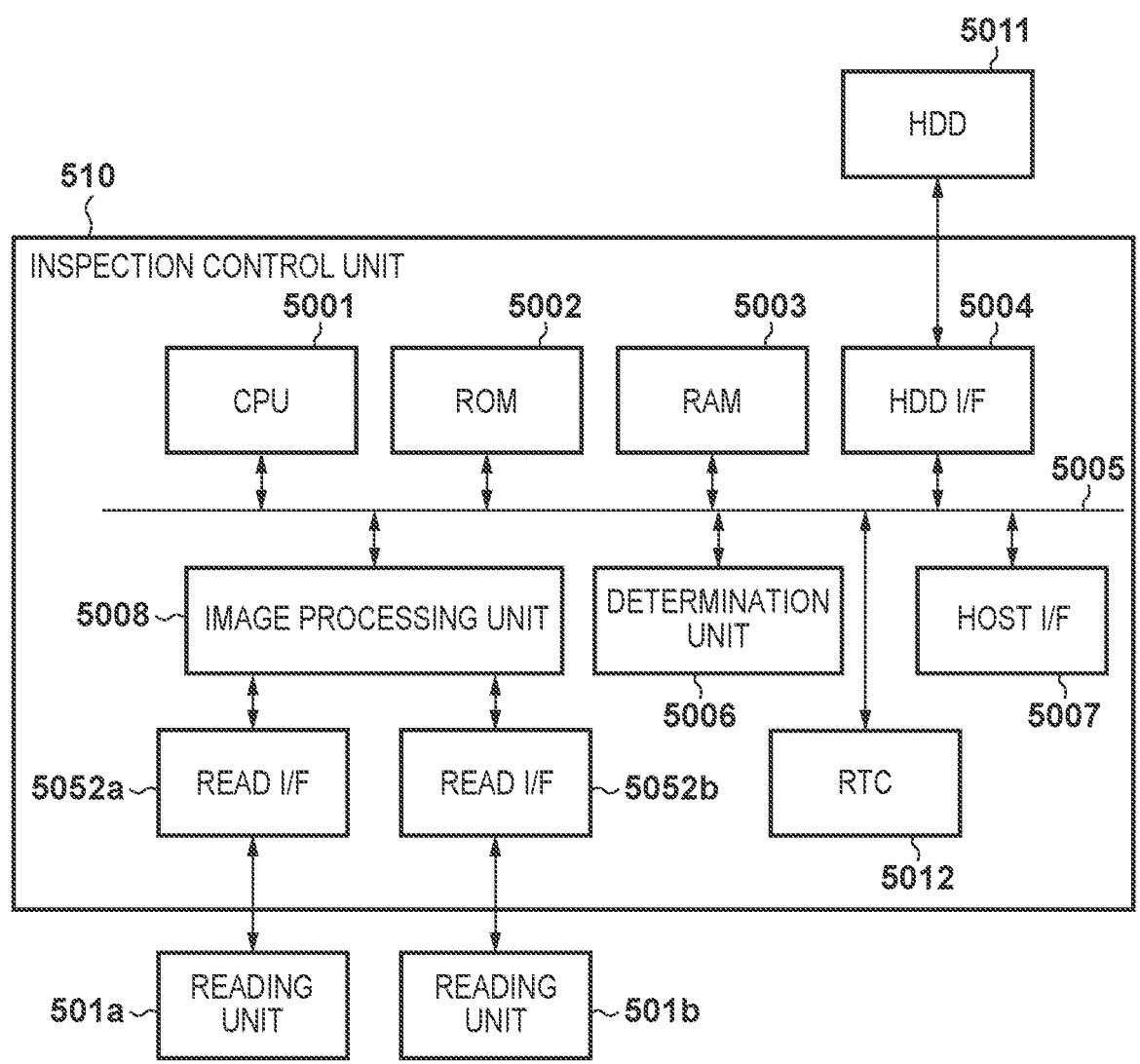
FIG. 3 is a configuration diagram of an inspection control unit according to an embodiment.

FIG. 3 is a configuration diagram of the inspection control unit 510. A CPU 5001, a ROM 5002, a RAM 5003, an HDD OF 5004, an image processing unit 5008, a determination unit 5006, an RTC 5012, and a host OF 5007 are connected to a bus 5005 of the inspection control unit 510. The CPU 5001 controls the operations of the inspection apparatus 500 by executing a computer program stored in the ROM 5002. The RAM 5003 provides a work area for the CPU 5001 to execute processing. The HDD OF 5004 controls the communication with an HDD 5011. The host OF 5007 controls the communication with the controller 400. For example, the image data acquired from the controller 400 by the host OF 5007 is stored in the HDD 5011. The RTC 5012 is a real time clock and executes time management.

Image POSITION ADJUSTMENT BASED ON READING RESULT

In the present embodiment, control is executed to adjust the position of an image formed by the image forming apparatus 300 on the basis of a reading result of the reading units 501*a* and 501*b*. Specifically, for example, when the user inputs an instruction to adjust the position of an image formed by the image forming apparatus 300 using the operation unit 200, the controller 400 controls the image forming apparatus 300 to form a pre-determined position adjustment chart on a printing medium. As a result, the image forming apparatus 300 forms the position adjustment chart on the printing medium, and the printing medium with the formed position adjustment chart is conveyed to the inspection apparatus 500. The reading units 501*a* and 501*b* of the inspection apparatus 500 read the position adjustment chart. Note that the distance between the position on the printing medium where the image of the position adjustment chart should be formed and the position of the edge of the printing medium is a predetermined value. The reading units 501*a* and 501*b* output the result of reading the position adjustment chart to the image processing unit 5008 via reading I/Fs 5052*a* and 5052*b*, respectively.

The image processing unit 5008 calculates the distance between the position of the edge of the printing medium for the image obtained by the reading units 501*a* and 501*b* reading the position adjustment chart and the position of the image of the position adjustment chart. Also, the image processing unit 5008 calculates the difference value between the calculated distance and the predetermined value and transmits the difference value to the image forming apparatus 300. The image forming apparatus 300 adjusts the position where the image should be formed on the printing medium so that the difference value is reduced. In other words, to reduce the difference value, the image forming condition for forming the image on the printing medium is re-set. Note that the image of the position adjustment chart may be a registration (trim) mark or a patch, for example.

Also, in the present embodiment, as the backings 503*a* and 503*b*, a backing member with high density (black, for example) is used. By using such a backing member, the position of the edge of the printing medium can be detected with high accuracy. As a result, the position where the image should be formed on the printing medium can be adjusted with high accuracy. Note that the color black according to the present embodiment refers to a color with a luminance value for each color R, G, and B when the backing member is read by the reading units 501*a* and 501*b* of (R, G, B)=(0, 0, 0) to (50, 50, 50), for example.

Image Inspection Based on Reading Result

In the present embodiment, the quality of the image formed by the image forming apparatus 300 on the basis of a reading result of the reading units 501*a* and 501*b* is inspected. Specifically, for example, when the user inputs an instruction to inspect the quality of an image formed by the image forming apparatus 300 using the operation unit 200, the inspection apparatus 500 reads the image formed on the printing medium by the image forming apparatus 300. Also, the inspection control unit 510 acquires the RIP data (described below in detail), which is the original data of the image data used in forming the printed article, from the controller 400.

The image processing unit 5008 corrects the read data so that the effects of the reflection included in the image read by the reading units 501*a* and 501*b* are reduced. The details will be described below.

The inspection control unit 510 includes correction data of a correction parameter. The correction parameter is a parameter for correcting the error component included in the reading result from the reading units 501*a* and 501*b* and is generated via calibration described below. Note that, as described above, the error component may include the difference between the color indicated by the RIP data and the color indicated by the inspection target data.

The inspection control unit 510, for example, executes quality inspection of the printed article by correcting the read data (inspection target data) to reduce the effects of reflection using the correction parameter and comparing the corrected inspection target data and the RIP data. Note that the inspection control unit 510 may correct the RIP data using the correction parameter.

Also, as the item for quality inspection of the printed article, the color of an image is inspected, for example. The color inspection, for example, is executed on the basis of the difference value between the R image data (luminance data) in the reference data and the R image data (luminance data) in the inspection target data, for example. Specifically, when the difference value is equal to or greater than a predetermined value, fail is determined, and when the difference value is less than the predetermined value, pass is determined. This processing is also executed for G and B.

As described above, in the present embodiment, the reading units 501*a* and 501*b* are used in controlling the adjustment of the position of the image formed by the image forming apparatus 300 and inspecting the quality of the image formed by the image forming apparatus 300.

Figure 4:
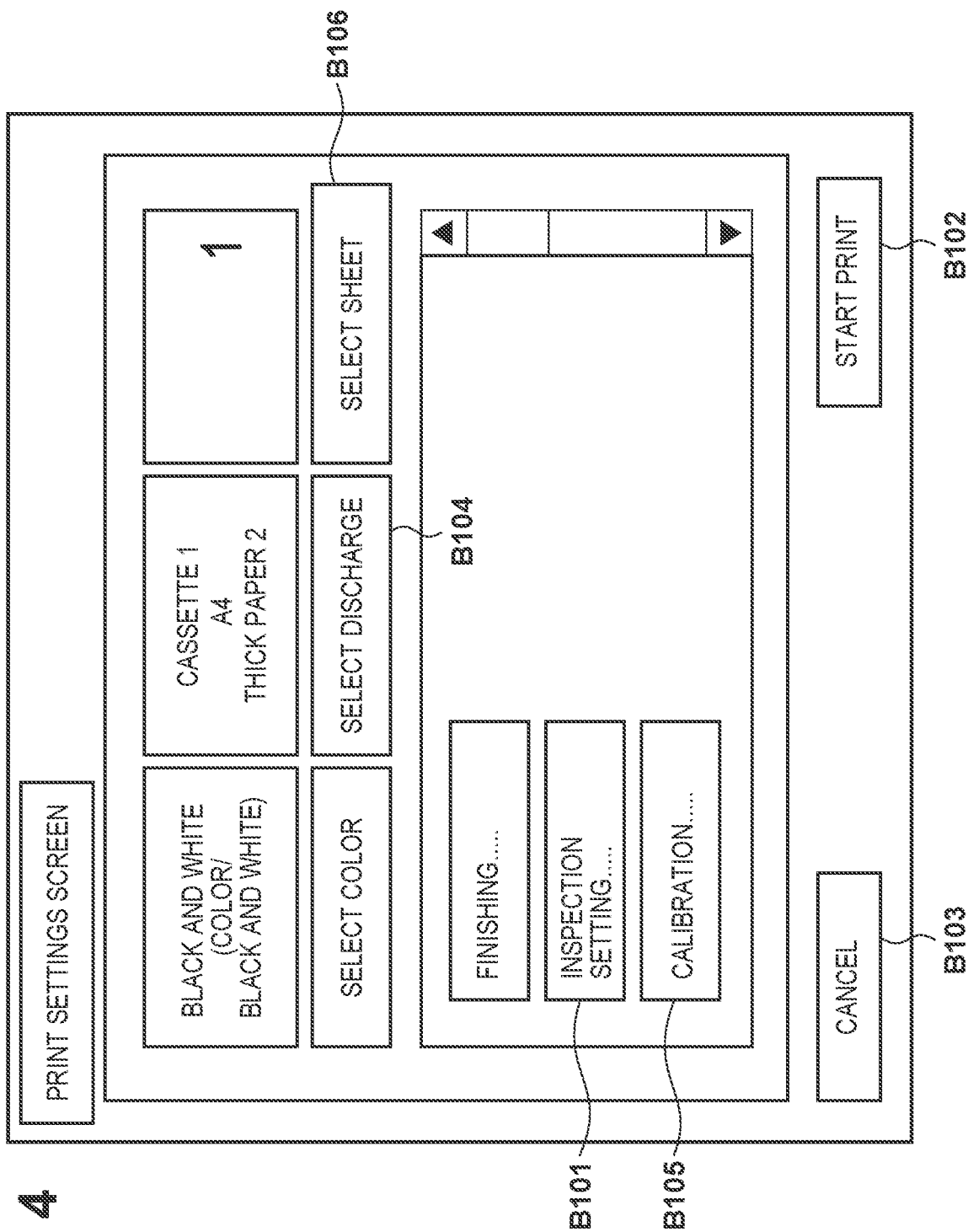
FIG. 4 is a diagram illustrating an example of a screen displayed on an operation unit according to an embodiment.

FIG. 4 is a diagram illustrating an example of a print settings screen displayed on the display of the operation unit 200. The user can control the operations of the image forming apparatus 300 by operating the operation unit 200 using the screen displayed on the display. For example, as illustrated in FIG. 4, the discharge destination for the printed article can be set via a button B104. Also, the user can select the size and paper type of the printing medium via a button B106. When a button B102, that is the print start button, is pressed, the controller 400 transmits the image data to the image forming apparatus 300 and causes the image forming apparatus 300 to form an image. When a button B103, which is the cancel button, is pressed, a predetermined initial screen is displayed on the display of the operation unit 200. When a button B105 is selected, the image forming apparatus 300 prints the test chart described below and causes the inspection apparatus 500 to read the test chart to generate the correction parameter. When a button B101 is selected, for example, the inspection settings screen illustrated in FIG. 5 is displayed on the display.

Figure 5:
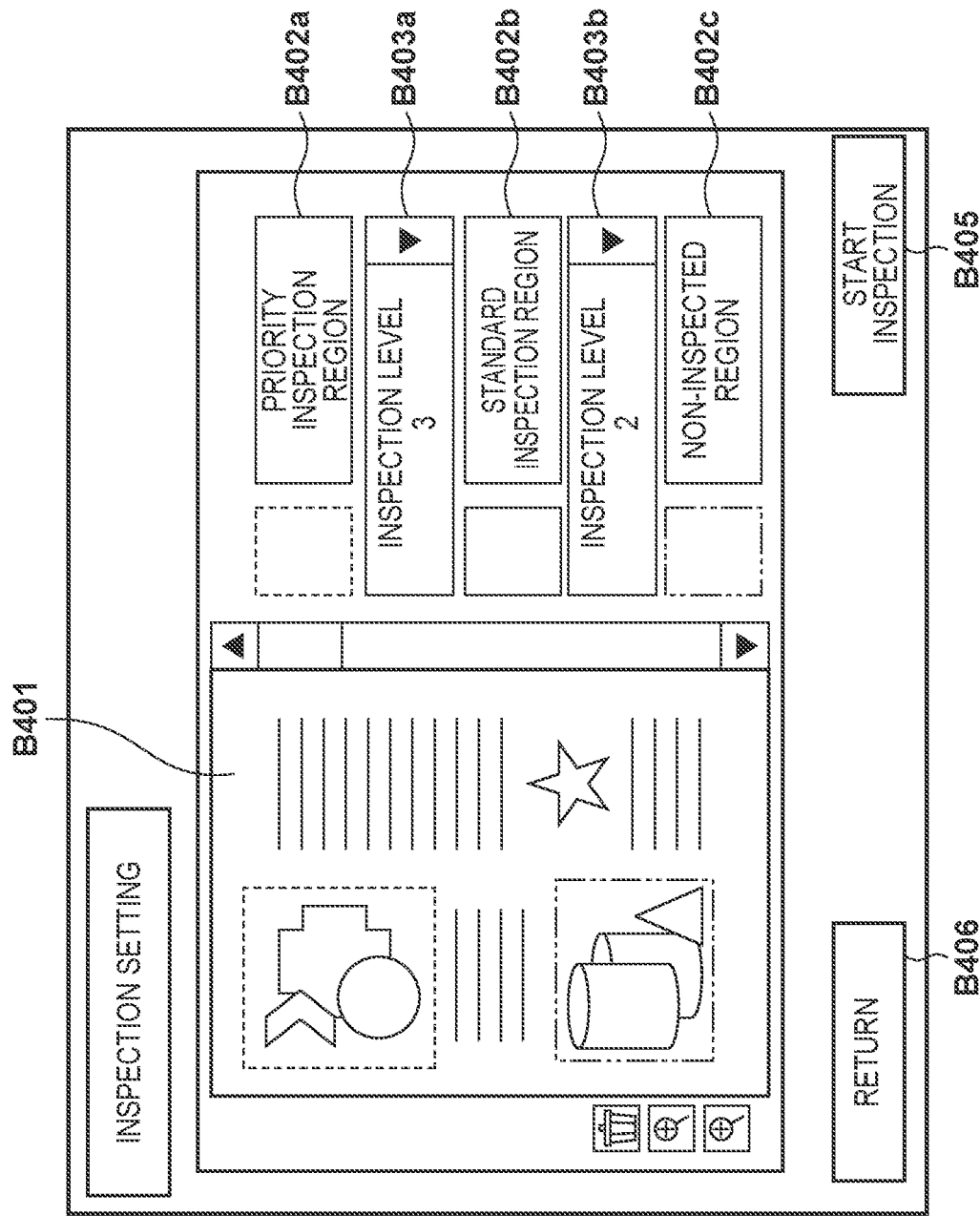
FIG. 5 is a diagram illustrating an example of a screen displayed on an operation unit according to an embodiment.

The inspection settings screen illustrated in FIG. 5 is a screen for the user to set various types of settings when executing quality inspection using the inspection apparatus 500. The image to be inspected, which is the quality inspection target, is displayed in an area B401 of the inspection settings screen. The image data (RIP data) for forming the image to be inspected is stored in advance in the HDD 4100 of the image forming apparatus 300, for example. By the user selecting the region of the area B401 via a touch operation when an inspection area type button represented by buttons B402a to B402c is selected, the settings of the inspection area can be set. Note that the button B402a is a button for setting the region to perform a highly accurate inspection, and the button B402b is a button for setting the region to perform a standard inspection. Also, the button B402c is a button for setting a region to not execute inspection on.

Buttons B403a and B403b are buttons for setting the inspection level that is the inspection accuracy, to different levels such as levels 1 to 5, for example. The user can set the inspection level for each region of the buttons B402a and B402b. A button B405 is an inspection start button. When the user selects this button, the inspection printing processing is started. In other words, the inspection apparatus 500 executes quality inspection of the printed article by reading the printed article, which is the image to be inspected, formed by the image forming apparatus 300, generating the inspection target data, and comparing this to the reference data. A button B406 is a button for returning to the original screen. When the user selects this button, the print settings screen in FIG. 4 is returned to.

Figure 6:
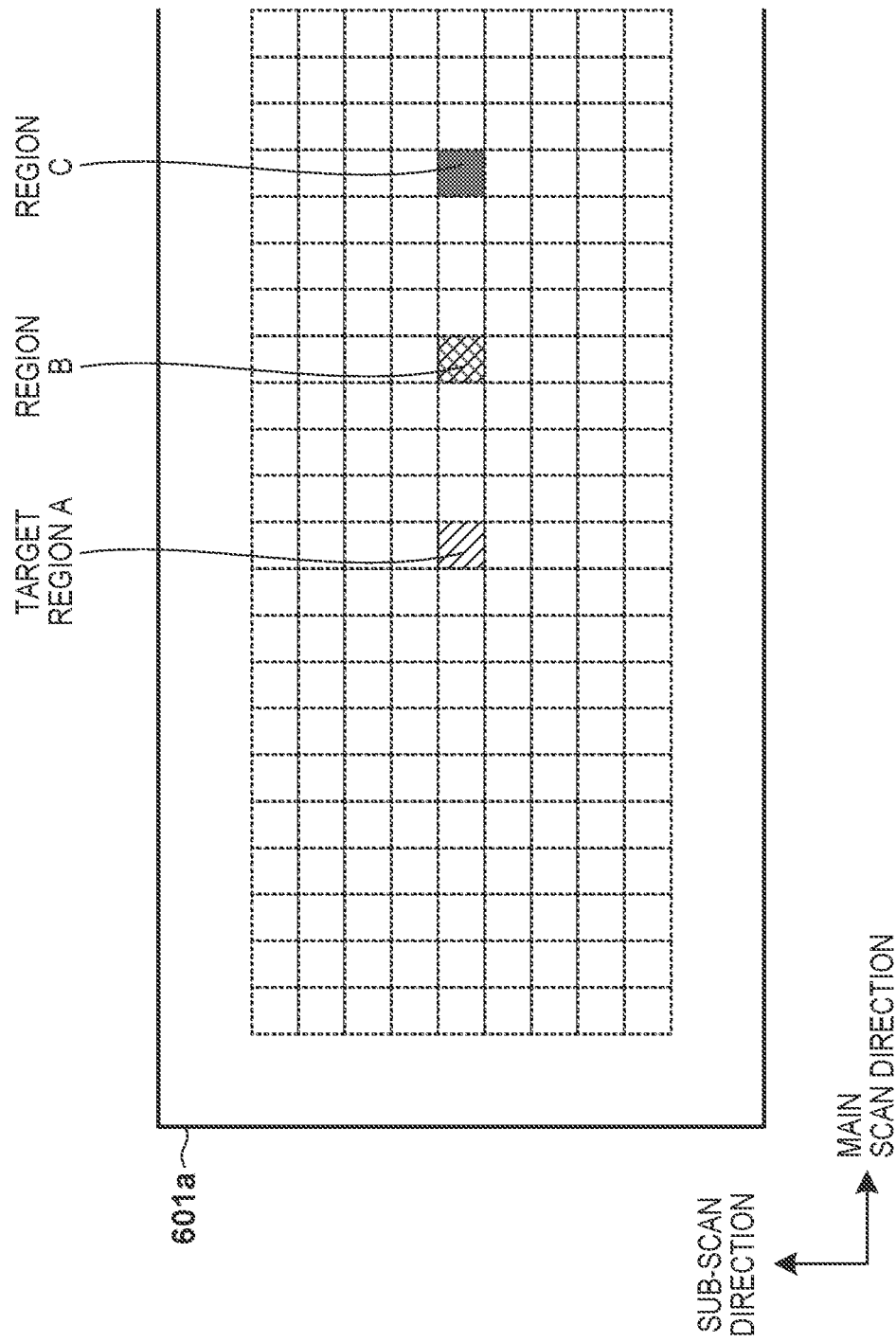
FIG. 6 is an explanatory diagram for reflection.
Figure 7:
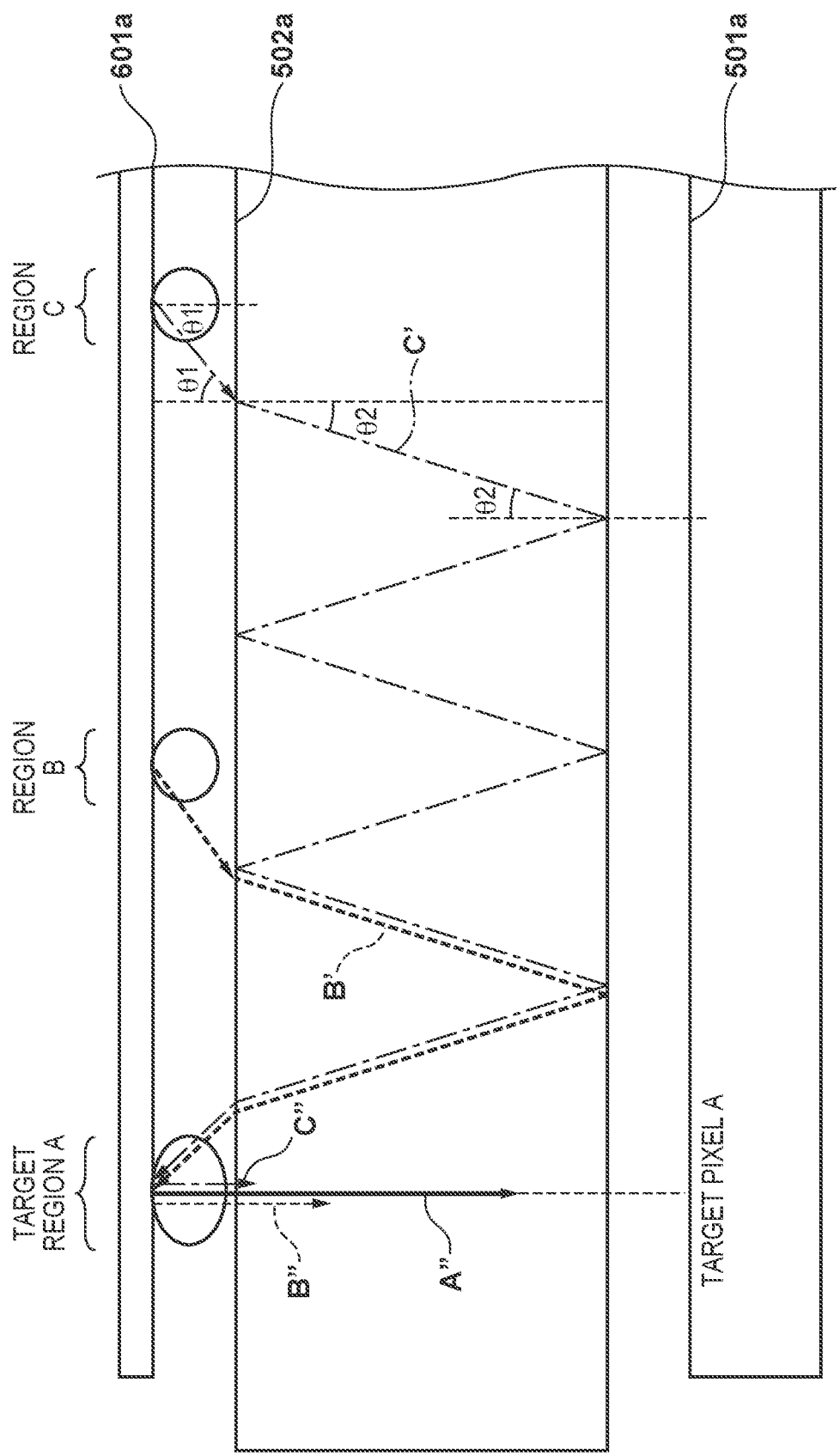
FIG. 7 is an explanatory diagram for reflection.

Reflection will now be described. FIG. 6 is a diagram illustrating a surface 601a of a white printing medium on the reading unit 501a side in a state with a plurality of divided regions. Each region corresponds to one pixel of the light-receiving unit of the reading unit 501a. Note that in FIG. 6, a sub-scan direction corresponds to the conveyance direction of the printing medium, and a main scan direction is a direction orthogonal to the conveyance direction of the printing medium. In an ideal state, one pixel of the light-receiving unit of the reading unit 501a receives only the reflected light reflected at the corresponding region on the surface 601a. However, each pixel also receives reflected light reflected at regions other than the corresponding region. This is illustrated in FIG. 7. In FIG. 7, a pixel of the reading unit 501a corresponding to a target region A on the surface 601a of the printing medium is indicated as target pixel A.

As illustrated in FIG. 7, the light reflected at a region B and a region C different from the target region A propagates through the glass 502a and travels toward the target region A as illustrated by reflected light B' and reflected light C' in FIG. 7 due to the difference between the refractive index of the glass 502a, a transparent member, and the refractive index of air. Also, the reflected light B' and the reflected light C' reflected at the target region A are incident at the target pixel A as reflected light B" and the reflected light C". Note that in FIG. 7, reflected light A" should be the reflected light reflected at only the target region A that the target pixel A should receive. Note that the reflected light C' is reflected within the glass 502a more times than the reflected light B', and thus the intensity of the reflected light C" is lower than the intensity of the reflected light B". In FIG. 7, only the reflected light from the region B and the region C with the same position in the sub-scan direction as the target region A is illustrated, but the reflected light from various regions around the target region A is also incident on the target pixel A. Thus, in addition to the necessary reflected light A", unnecessary reflected light from the surrounding regions is also incident on the target pixel A, increasing the amount of light received by the target pixel A and causing reflection.

Figure 8:
FIG. 8 is a diagram illustrating an example of the magnitudes of the effects of reflection convert to numerical values.

FIG. 8 is a diagram of the magnitude of the reflection effect from the regions around the target region corresponding to the target pixel converted to numerical values. Note that larger numerical values indicate that the effect is large, and a region with a value of 0 indicates that the region does not contribute to the reflection effect on the target pixel. As illustrated in FIG. 8, the regions that are closer in terms of distance to the target region corresponding to the target pixel have a larger magnitude for the reflection effect.

Figure 9:
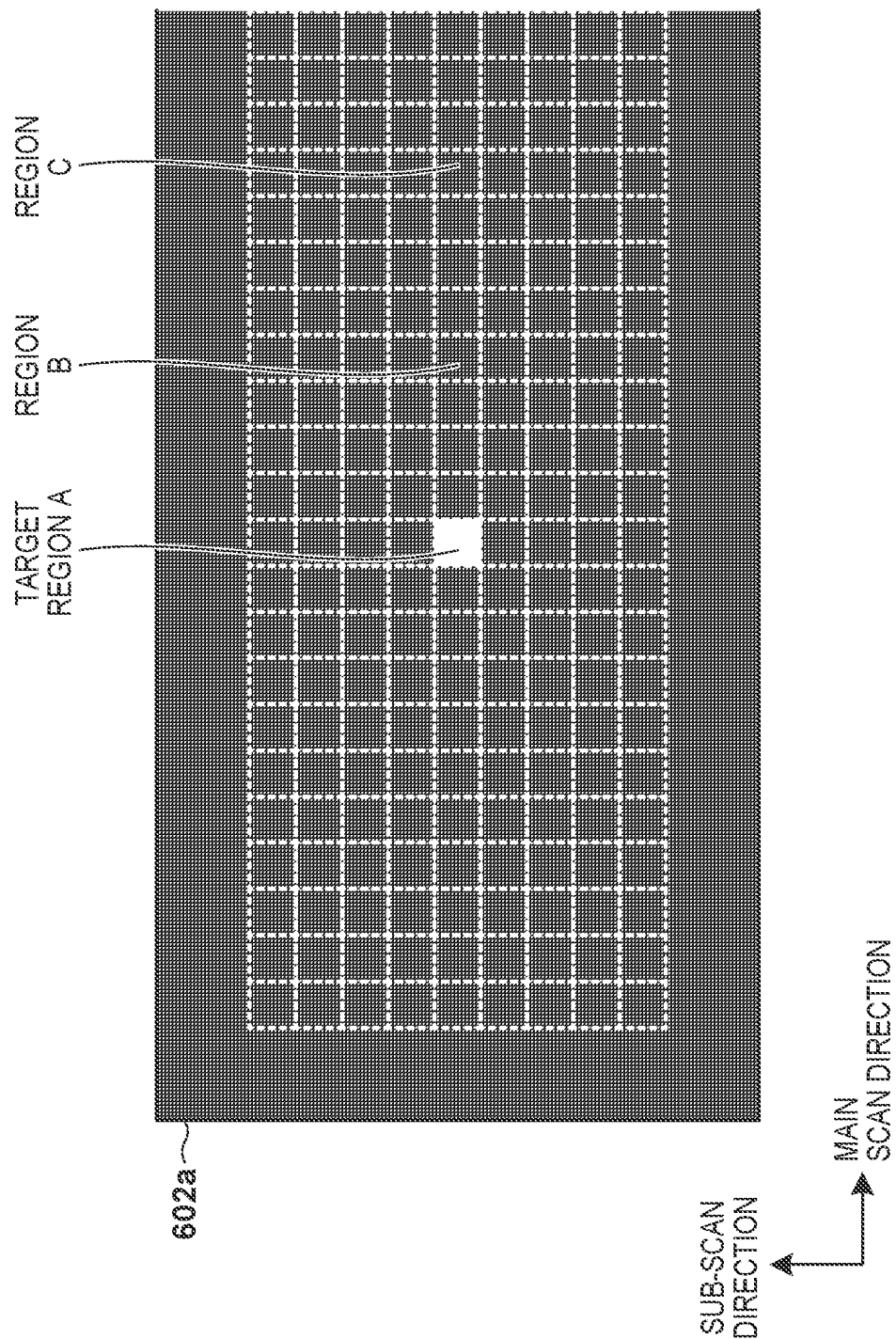
FIG. 9 is an explanatory diagram of a method for determining the magnitude of the effects of reflection.

The magnitude of the effect from the regions around the target region illustrated in FIG. 8 can be determined by using a printing medium including a surface 602a with the same white color as on the surface 601a in FIG. 6 for only the target region A and with solid black with a uniform density for the remaining regions as illustrated in FIG. 9. In the printing medium in FIG. 9, since the regions other than the target region A are solid black, the light incident on the target pixel A after being reflected at the regions other than the target region A is greatly reduced compared to when using the printing medium in FIG. 6. Accordingly, for example, if the amount of received light for the target pixel A using the printing medium in FIG. 6 is 260 and the amount of received light for the target pixel A using the printing medium in FIG. 9 is 250, then the increase in the amount of received light due to reflection is 10. Accordingly, the magnitude of the effect from the regions around the target region is determined to be 10/250=0.040. In this manner, the magnitude of the effect as illustrated in FIG. 8 is a value that can be determined in advance such as at the development stage.

The increase in the amount of received light of the target pixel illustrated in FIG. 8 due to reflection can be determined by, for each of the first regions with a magnitude of the effect greater than 0, multiplication of the amount of received light of the corresponding pixel and the magnitude of the effect of the first region and integration of the post-multiplication amount of received light for all of the first regions. Note that as the amount of received light of the pixel corresponds to the luminance value, the term 'amount of received light' according to the present embodiment can be substituted for the term 'luminance value'. Accordingly, information indicating the magnitude of the effect from the regions around the target region illustrated in FIG. 9 is stored in advance in the HDD 5011 illustrated in FIG. 3 or the ROM 5002 of the inspection control unit 510. The image processing unit 5008 in FIG. 3 determines the increase due to reflection in the amount of received light of the target pixel on the basis of the information indicating the magnitude of the effect from the regions around the target region and corrects the amount of received light of the target pixel. In this manner, image processing unit 5008 corrects the inspection target data, reducing the effects of reflection included in the image read by the reading units 501*a* and 501*b*. Note that processing to reduce the effects of reflection may not be executed on the inspection target data, and processing to add the effects of reflection to the reference data may be executed.

Figure 10:
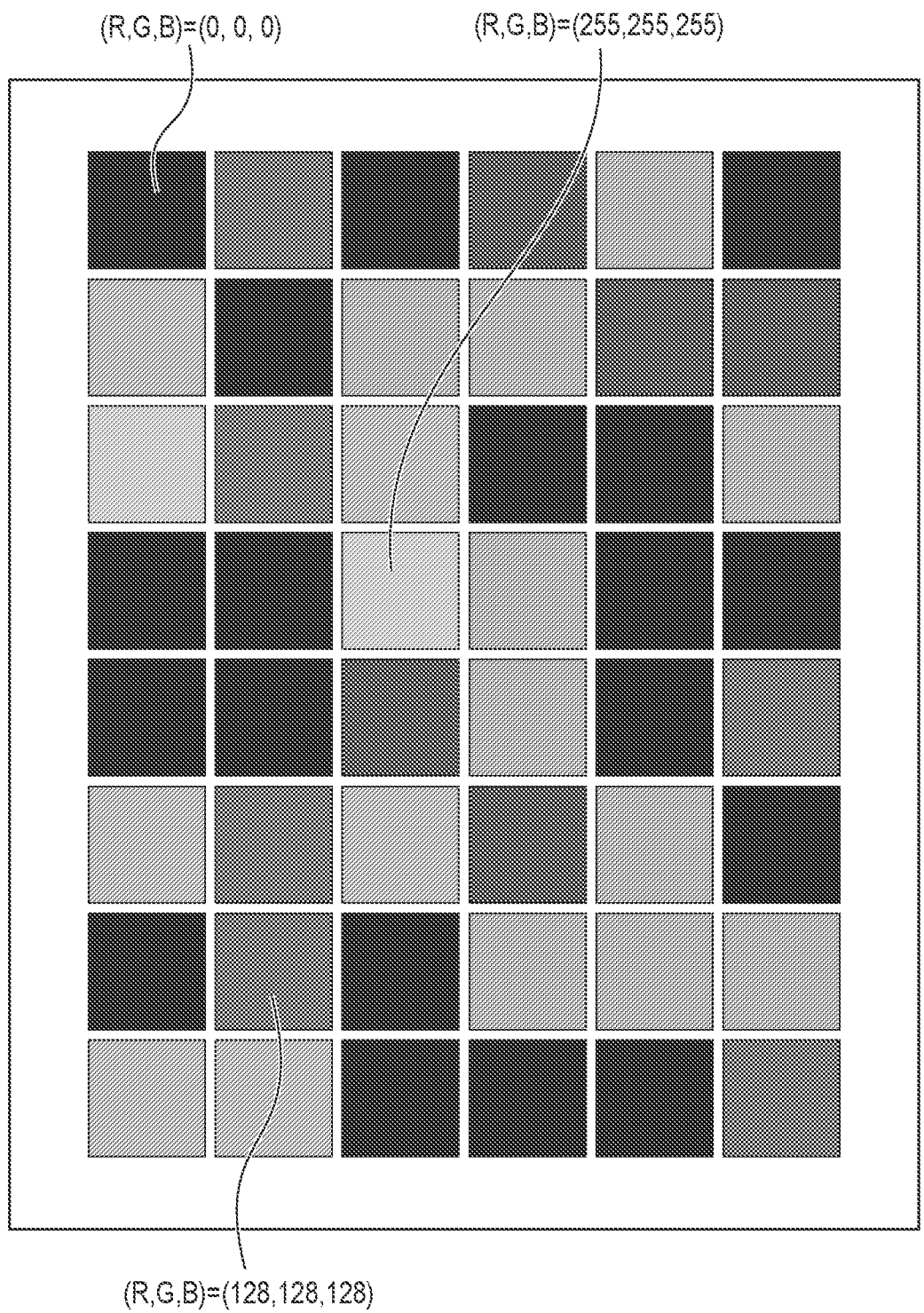
FIG. 10 is a diagram illustrating an example of a test chart.

Next, a test chart formed by the image forming apparatus 300 when the button B105 in FIG. 4 is pressed will be described. FIG. 10 is a diagram illustrating an example of a test chart. In the example in FIG. 10, a total of 48 patch images (hereinafter referred to simply as patches) are formed on the surface of the printing medium. Note that the color and density of the patches are all different.

Figure 11:
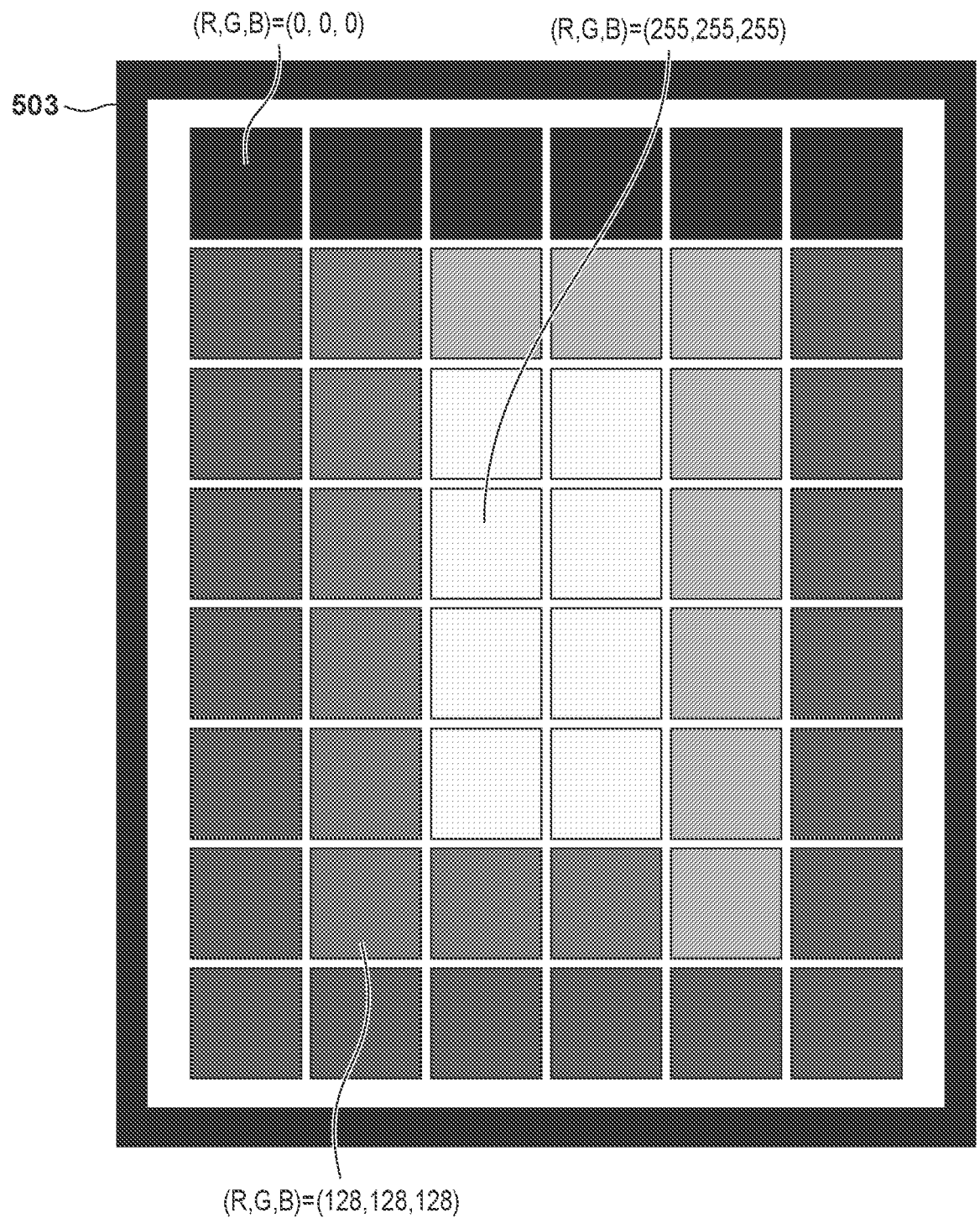
FIG. 11 is a diagram illustrating a test chart according to an embodiment.

FIG. 11 is a diagram illustrating an example of a test chart according to the present embodiment. In the present embodiment, since the backings 503 are high in density, the patches are disposed with high-density patches being disposed in the peripheral portion (end portions) of the printing medium and the density decreasing towards the center of the printing medium. As illustrated in FIG. 8, the effects of reflection are greater the closer the region is to the target region in terms of distance. Accordingly, the effects of reflection can be reduced by disposing the patches of the test chart so that the difference between the density of the patch and the density around the patch is reduced as illustrated in FIG. 11. Note that the density around the patch includes the density of patches around the patch and the density of the backings 503 adjacent to the patch.

Figure 12:
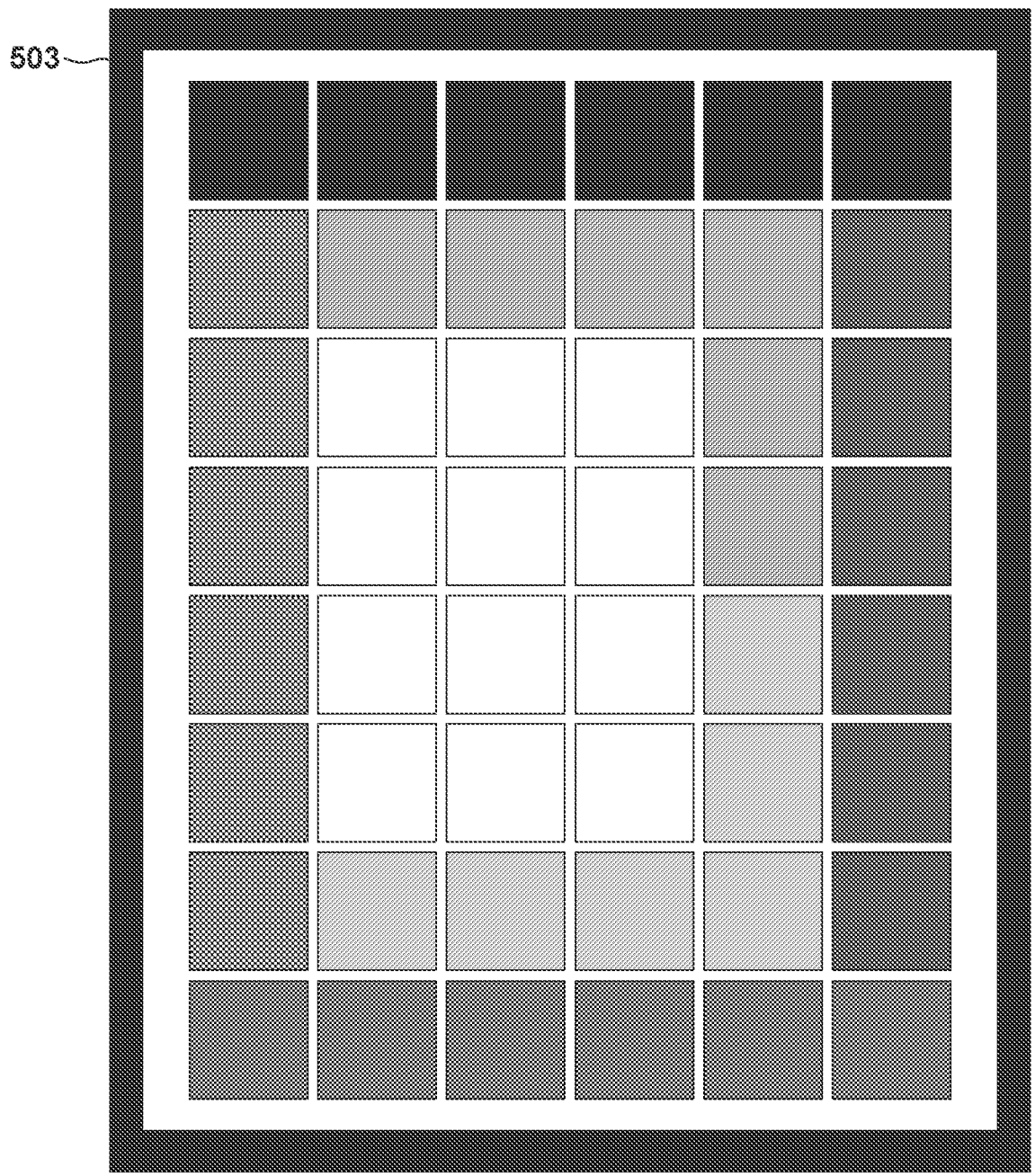
FIG. 12 is a diagram illustrating a test chart according to an embodiment.

In FIG. 11, the patches with (R, G, B)=(0, 0, 0) are formed at positions farthest from the center, the patches with (R, G, B)=(255, 255, 255) are formed at positions closest to the center, and the patches with (R, G, B)=(128, 128, 128) are formed between the patches with (R, G, B)=(0, 0, 0) and the patches with (R, G, B)=(255, 255, 255), but no such limitation is intended. For example, as illustrated in FIG. 12, the patch (reference position patch) in the upper left corner of the patches formed on the printing medium may be set to (R, G, B)=(0, 0, 0), and the density of the patches may gradually decrease in a spiral pattern going clockwise or anti-clockwise.

Also, a dummy patch or a low-density patch may be included in a high-density patch group, for example. A high-density patch (dark patch) refers to a patch image with luminance values for the RGB colors are (R, G, B)=(0, 0, 0) to (80, 80, 80) when read by the reading units 501*a* and 501*b*, for example. Also, a low-density patch (light patch) refers to a patch image with luminance values for the RGB colors are (R, G, B)=(180, 180, 180) to (255, 255, 255) when read by the reading units 501*a* and 501*b*, for example.

When the button B105 in FIG. 4 is pressed, the image forming apparatus 300 forms the test chart illustrated in FIG. 11. The inspection apparatus 500 reads the image of the test chart using the reading units 501*a* and 501*b*. The CPU 5001 determines the correction parameter on the basis of the difference (or ratio) between the read data and the RIP data corresponding to the test chart. The correction parameter is used in the inspection printing processing when the button B405 in FIG. 5 is pressed.

In the present embodiment, as the backings 503, a backing member with high density (black, for example) is used. By using such a backing member, the edge of the printing medium can be detected with high accuracy and the position where the image should be formed on the printing medium can be adjusted with high accuracy. As a result, misalignment of the relative positions of the image to be inspected and the reference image can be suppressed. This can suppress a decrease in the proportion of pass results relative to the number of inspections when inspecting images to be inspected. With such a configuration, the high-density patches of the test chart are disposed in the peripheral portion (end portions) of the printing medium and the low-density patches are disposed closer to the center of the printing medium. Thus, the test chart can be read with reduced effects of reflection, and the accuracy of the correction parameter generated on the basis of the reading result can be increased. As a result, a decrease in the accuracy of the inspection of the quality of an image formed on a printing medium can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-084729, filed May 24, 2022, and Japanese Patent Application No. 2023-037831, filed Mar. 10, 2023, which are hereby incorporated by reference herein in their entirety.

What is claimed is:

1. An image forming system comprising:
   an image forming apparatus configured to form an image on a printing medium on a basis of image data;
   a reading apparatus configured to read the image on the printing medium, the reading apparatus including:
      a transparent member; and
      a sensor including a plurality of pixels that receive reflected light, via the transparent member, from the image on the printing medium; and
   at least one processor configured to:
      generate a correction condition for correcting an error factor based on a ratio between a reading result of a test chart read by the reading apparatus and RIP data corresponding to the test chart, the error factor occurring when light from a position other than a reading position on the printing medium corresponding to a pixel is repeatedly reflected inside the transparent member and is received by the pixel, the test chart being an image including a first brightness area, a second brightness area, and a third brightness area arranged in order in a direction perpendicular to a conveyance direction of the printing medium, brightness of the first brightness area being lower than brightness of the second brightness area, brightness of the second brightness area is higher than brightness of the third brightness area; and inspect the image read by the reading apparatus based on a reading result of the image, the image data and the correction condition.

2. The image forming system according to claim 1, wherein
the at least one processor is configured to receive an instruction to form the test chart, and
the image forming apparatus forms the test chart based on the instruction.

3. The image forming system according to claim 1, wherein
the at least one processor is configured to correct the reading result of the image read by the reading apparatus based on the correction condition, and inspect the image read by the reading apparatus based on the corrected reading result of the image and the image data.

4. The image forming system according to claim 1, wherein
the image of the test chart further includes a fourth brightness area and a fifth brightness area located on an opposite side of the fourth brightness area with respect to the second brightness area in the conveyance direction,
brightness of the fourth brightness area is lower than the brightness of the second brightness area, and
brightness of the fifth brightness area is lower than the brightness of the second brightness area.

5. An image forming system comprising:
an image forming apparatus configured to form an image on a printing medium on a basis of image data;
a reading apparatus configured to read the image on the printing medium, the reading apparatus including:
a transparent member; and
a sensor including a plurality of pixels that receive reflected light, via the transparent member, from the image on the printing medium; and
at least one processor configured to:
receive an instruction to form a test chart;
cause the image forming apparatus to form the test chart based on the instruction, the test chart being an image including a first brightness area, a second brightness area, and a third brightness area arranged in order in a direction perpendicular to a conveyance direction of the printing medium, brightness of the first brightness area being lower than brightness of the second brightness area, brightness of the second brightness area is higher than brightness of the third brightness area;
generate a correction condition for correcting an error factor based on a ratio between a reading result of a test chart read by the reading apparatus and RIP data corresponding to the test chart, the error factor occurring when light from a position other than a reading position on the printing medium corresponding to a pixel is repeatedly reflected inside the transparent member and is received by the pixel; and
correct a reading result of the image read by the reading apparatus based on the correction condition.

6. The image forming system according to claim 5, wherein
the image of the test chart further includes a fourth brightness area and a fifth brightness area located on an opposite side of the fourth brightness area with respect to the second brightness area in the conveyance direction,
brightness of the fourth brightness area is lower than the brightness of the second brightness area, and
brightness of the fifth brightness area is lower than the brightness of the second brightness area.

* * * * *